(12) United States Patent
Nixon

(10) Patent No.: US 11,859,557 B2
(45) Date of Patent: Jan. 2, 2024

(54) AIRCRAFT ENGINE GENERATOR DISCONNECT DEVICE WITH LATCH

(71) Applicant: SAFRAN ELECTRICAL & POWER, Blagnac (FR)

(72) Inventor: John Nixon, Buckinghamshire (GB)

(73) Assignee: SAFRAN ELECTRICAL & POWER, Blagnac (FR)

(*) Notice: Subject to any disclaimer, the term of this patent is extended or adjusted under 35 U.S.C. 154(b) by 472 days.

(21) Appl. No.: 17/282,606

(22) PCT Filed: Oct. 2, 2019

(86) PCT No.: PCT/EP2019/076707
§ 371 (c)(1),
(2) Date: Apr. 2, 2021

(87) PCT Pub. No.: WO2020/070190
PCT Pub. Date: Apr. 9, 2020

(65) Prior Publication Data
US 2021/0340915 A1 Nov. 4, 2021

(30) Foreign Application Priority Data
Oct. 5, 2018 (GB) .................................... 1816264

(51) Int. Cl.
*F16D 11/04* (2006.01)
*F16D 11/14* (2006.01)
(Continued)

(52) U.S. Cl.
CPC .................. *F02C 7/32* (2013.01); *F02C 7/36* (2013.01); *F16D 11/04* (2013.01); *F16D 11/14* (2013.01);
(Continued)

(58) Field of Classification Search
CPC ......... F16D 2011/002; F16D 2011/006; F16D 11/04; F16D 11/10; F16D 11/14; F16D 23/00; F16D 23/12; F16D 2023/123
See application file for complete search history.

(56) References Cited

U.S. PATENT DOCUMENTS 3,037,598 A 6/1962 Kafka
3,080,030 A 3/1963 Troeger
(Continued)

FOREIGN PATENT DOCUMENTS

EP 1391621 A2 2/2004
EP 2098741 A2 9/2009
(Continued)

OTHER PUBLICATIONS

International Search Report, PCT/EP2019/076707, dated Dec. 5, 2019, 3 pages.
Great Britain Search Report. GB1816264.4, dated Apr. 2, 2019, 3 pages.

*Primary Examiner* — Timothy Hannon
*Assistant Examiner* — Aimee Tran Nguyen
(74) *Attorney, Agent, or Firm* — Rankin, Hill & Clark LLP

(57) ABSTRACT

A generator drive disconnect device comprising a drive transfer means (100) having a connected configuration, and a disconnected configuration. The disconnect device further comprises a disconnect mechanism, configured to move the drive transfer means from the connected configuration to the disconnected configuration, and a latch mechanism configured to the hold the drive transfer means in the disconnected configuration. The latch mechanism includes a latch member, which is moveable between a retracted position and an extended position, and a biasing mechanism. The biasing mechanism is configured to generate a biasing force to bias the latch member towards the extended position and to apply (Continued)

a reaction force to the latch member to resist movement of the latch member towards the retracted position, the reaction force having a magnitude which increases as a function of the distance of the latch member from the retracted position.

19 Claims, 7 Drawing Sheets

(51) Int. Cl.
*F02C 7/32* (2006.01)
*F02C 7/36* (2006.01)
*F16D 11/00* (2006.01)

(52) U.S. Cl.
CPC .. *F16D 2011/002* (2013.01); *F16D 2011/006* (2013.01)

(56) References Cited

U.S. PATENT DOCUMENTS

| | | | |
|---|---|---|---|
| 3,080,031 A | 3/1963 | Young | |
| 2005/0133331 A1 | 6/2005 | Howard | |
| 2010/0108458 A1* | 5/2010 | Harris | F16D 23/12 |
| | | | 192/69 |
| 2017/0016489 A1 | 1/2017 | Grosskopf et al. | |
| 2019/0368237 A1* | 12/2019 | Distefano | F16C 1/12 |

FOREIGN PATENT DOCUMENTS

| | | |
|---|---|---|
| EP | 3309421 A1 | 4/2018 |
| GB | 506481 A | 5/1939 |
| WO | 2017/075180 A1 | 5/2017 |

* cited by examiner

AIRCRAFT ENGINE GENERATOR DISCONNECT DEVICE WITH LATCH

TECHNICAL FIELD

The invention relates to a disconnect device for disconnecting a rotational drive of an engine from a generator driven by the engine. In particular, the invention relates to a fail-safe disconnect device, particularly but not exclusively, for use in aircraft engines. Other aspects of the invention relate to an aircraft engine assembly and an aircraft including the disconnect device.

BACKGROUND OF THE INVENTION

Aircraft engines, such as jet or turbojet engines, can comprise electrical generators which generate electricity used by the aircraft during operation. Typically, the electrical generators are driven by a drive shaft which is connected, directly or indirectly (e.g. via a gear box), to the main turbine of the aircraft engine.

As with any mechanical system, mechanical failures can occur during normal operation of the electrical generators of an aircraft engine. A generator drive disconnect device, which can mechanically decouple the electrical generator from the engine's turbine must therefore be provided. Even though the loss of electrical energy generation capacity through disconnection can be serious, if a malfunctioning generator is not disconnected from the turbine, the aircraft engine as a whole may be damaged or its performance impeded.

A variety of generator drive disconnect devices are known in the art. The majority of prior art disconnect devices used in this context provide a means by which an axial force can be applied to the drive shaft, causing the drive shaft to move axially which in turn enables a decoupling mechanism to move from a connected configuration to a disconnected configuration in which drive from the engine to the generator is prevented. Known methods exist for providing this axial force in the prior art.

Some of the Known Methods can be Categorised as Follows:

1. Mechanical disconnect devices: A mechanical disconnector uses an actuator to release a large and powerful spring. This method typically has a robust assembly process and thus proves to be more reliable in service. However, the axial force it can produce is typically limited.

2. Hydraulic disconnect devices: Using hydraulic pressure from the oil cooling system of an aircraft engine to provide the axial force required for disconnection. This solution can provide very high disconnecting forces.

3. Pneumatic disconnect devices: Applying a pneumatically actuated disconnect mechanism to provide the required axial forces for disconnecting the generator drive. Similar to the hydraulic solution, the pneumatic actuators can provide very high disconnecting forces. However, separate gas storage tanks are required to provide the required pressurised gas.

Once actuated, the generator drive disconnect device should be maintained in the actuated condition so that the generator remains disconnected from the engine until the malfunction can be fixed by a maintenance operative and the generator drive disconnect device reset. Generator drive disconnect devices are used to prevent damage from being inflicted and so premature reconnection during operation of the engine may result in damage and/or engine shutdown.

In some of the above known types of generator drive disconnect device, the actuating force can be reliably maintained by the disconnect device alone until the flight is finished and the cause of the failure investigated. In others, for example in the pneumatic disconnect system, the actuating force might not be maintained by the disconnect mechanism in the event of pressure loss, for example due to a leak or a failure in the gas storage tank. This can result in inadvertent reconnection of the generator to the engine. To prevent this, it is known to use a disconnect latch to hold the generator drive disconnect device in the actuated condition to ensure that the generator remains disconnected from the engine even if the actuating force provided by the disconnect device is not maintained.

Existing disconnect latch devices typically use a basic spring loaded latch. In such latches, the spring rate is generally selected as a compromise between applying sufficient force to maintain a latched state when the spring is fully extended and avoiding applying excessive frictional forces to the disconnect device when the spring is compressed prior to actuation of the disconnect device, which might otherwise hinder actuation of the disconnect device. However, with such latch devices, the spring force might not be sufficient to hold the latch in the latched state in the event of high levels of vibration or severe operating conditions.

In view of the above, it would be desirable to provide an improved generator drive disconnect device.

SUMMARY OF THE INVENTION

In a first aspect of the present invention, there is provided a generator drive disconnect device of a generator arranged to be driven by an aircraft engine, the disconnect device comprising: a drive transfer means for transferring drive from an input shaft of the generator to a rotor of the generator, the drive transfer means having a connected configuration and a disconnected configuration; a disconnect mechanism configured to move the drive transfer means from the connected configuration to the disconnected configuration; and a latch mechanism configured to hold the drive transfer means in the disconnected configuration, the latch mechanism comprising: a support structure; a latch member, moveable between an extended position in which the latch mechanism restricts movement of the drive transfer means from the disconnected configuration to the connected configuration, and a retracted position in which it does not restrict movement of the drive transfer means; and a biasing mechanism configured to generate a biasing force to bias the latch member towards the extended position and to provide a reaction force to the latch member to resist movement of the latch member towards the retracted position, the reaction force having a magnitude which increases as the distance of the latch member from the retracted position increases.

With the disconnect device of the present invention, the magnitude of the reaction force increases with an increase in the distance of the latch member from the retracted position. The magnitude of the reaction force therefore increases as a function of the distance of the latch member from the retracted position. Otherwise stated, the closer the latch member is to the extended position, the greater the retraction force required to rotate the latch member back towards the retracted position. Thus, the retraction force required to move the latch member in the retraction direction when it is in the extended position is higher than the retraction force required to move the latch member in the retraction direction when it is in the retracted position. This differs from conventional sprung latches, in which resistance to movement of the latch towards the retracted position tends to decrease as the latch member moves away from the retracted position. The present invention allows the latch member to be securely held in the extended position against vibration or other severe operating conditions, such as high acceleration loads, without hindering the operation of the drive transfer means when the latch member is in the retracted position.

The biasing mechanism may have any suitable mechanism by which forces are transferred to the latch member. For example, the biasing mechanism may comprise a sprung arm which is connected to the latch member by a pivot. In such examples, the angle of the arm relative to latch member may change as the latch member moves to the extended position such that the biasing force applied to the latch member increases.

Preferably, the generator drive disconnect device further comprises a cam-follower mechanism comprising a cam surface and a follower by which the biasing force and the reaction force are applied to the latch member. The follower may be a roller follower. The follower may be a drive pin.

The cam surface may form part of the biasing mechanism. In such examples, the follower may form part of the latch member or part of an intermediate component.

Preferably, the latch member comprises the cam-surface and the biasing mechanism comprises the follower.

Preferably, the biasing mechanism comprises a biasing means configured to apply the biasing force in a biasing direction. The biasing direction may vary as a function of the position of the latch member. Preferably, the biasing direction is substantially constant across the range of movement of the latch member between the retracted and extended positions. This can improve the efficiency with which the biasing force is applied to the latch member across the range of movement of the latch member. The biasing mechanism may comprise a biasing means configured to apply the biasing force in a biasing direction to the follower.

Preferably, the cam surface is shaped such that, when the latch member is in the retracted position, the follower is in contact with a first portion of the cam surface which is at a first angle to the biasing direction, and, when the latch member is in the extended position, the follower is in contact with a second portion of the cam surface which is at a second angle to the biasing direction. The second angle is preferably less than the first angle. This provides a convenient and robust mechanism by which the magnitude of the reaction force can be increased as a function of the distance of the latch member from the retracted position.

The cam surface may be defined by an outer surface of the latch member. In such examples, the follower is configured to slide or roll along the outer surface of the latch member but may be moved away from the cam surface. Preferably, the latch member comprises a latch slot which defines the cam surface and within which the follower is received. In this manner, relative movement between the latch member and the follower may be constrained along the latch slot.

The follower may be free to move relative to the support structure. The follower may be constrained in one or more directions by the biasing mechanism so that movement of the follower causes a reaction force to be applied by the biasing mechanism to the latch member. Preferably, the support structure comprises a bearing surface along which the follower is configured to slide, the bearing surface being opposed to the cam surface. With this arrangement, movement of the follower away from the cam surface can be restricted or prevented by the bearing surface.

The bearing surface may be defined by an outer surface of the support structure. In such examples, the follower may be configured to slide or roll along one or more outer surfaces of the support structure but may be moved away from the bearing surface towards the cam surface. Preferably, the support structure comprises a support slot which defines the bearing surface and within which the follower is received. The follower may be constrained to move along the support slot. With this arrangement, movement of the follower away from the bearing surface can be restricted by the opposite side of the support slot.

The bearing surface may be linear or non-linear. Where the biasing mechanism comprises a biasing means for generating the biasing force in a biasing direction, preferably the bearing surface is linear and is substantially parallel to the biasing direction. With this arrangement, the follower is constrained to move along the bearing surface in the biasing direction. The can improve the efficiency with which the biasing force is transferred to the follower by the biasing means.

The cam surface may be linear. The cam surface may comprise a plurality of linear portions at a different angle to each other. The cam surface may be curved, preferably such that the magnitude of the reaction force increases exponentially as the latch member moves towards the extended position.

The latch member may be rotatably mounted to the support structure about a pivot for rotation between the retracted position and the extended position.

The pivot may be positioned such that, when the latch member is in the extended position, movement of the drive transfer means towards the connected configuration biases the latch member toward the extension direction. This further improves the ability of the mechanism to resist unwanted de-latching under severe operating conditions such as vibration or high acceleration loads.

The generator drive disconnect device may further comprise a cam-follower mechanism comprising a cam surface and a follower by which the biasing force and the reaction force are applied to the latch member. The cam follower mechanism may be configured such that a position of contact between the cam surface and the follower moves away from the pivot as the latch member moves towards the extended position.

The disconnect mechanism may comprise an actuator arranged to move the drive transfer means from the connected configuration to the disconnected configuration. The latch member may comprise a latch surface, which may be biased against an outer surface of the actuator by the biasing mechanism to prevent movement of the actuator when the latch member is in the extended position.

The outer surface of the actuator may comprise a recess, in which at least part of the latch surface may be received when the drive transfer means is in the disconnected configuration.

The latch surface may be tapered relative to the outer surface of the actuator, such that the latch surface is in contact with the outer surface of the actuator towards a radially outer end of the latch surface.

The support structure may comprise an access port through which a latch disengage tool is insertable to return the latch member to the retracted position from the extended position. This can facilitate manual de-latching of the latching mechanism.

The generator drive disconnect device may comprise a resilient member arranged to bias the drive transfer means into its connected configuration. This particular arrangement provides for a simple and cost effective way of enabling the generator drive disconnect device to be reconnected, once the emergency situation no longer exists and the latch mechanism moved to the retracted position. For example, when the latch mechanism is moved to the retracted position, the restoring force of the resilient member, such as a coil spring, may be utilised to transfer the drive transfer means from its disconnected configuration into its connected configuration.

The drive transfer means may comprise a separable drive transfer device. The separable drive transfer device may comprise a clutch arrangement, preferably a dog clutch. The clutch arrangement may removably connect the input shaft to an output shaft of the drive transfer device, both of which may be arranged concentrically about the same longitudinal axis.

According to a second aspect of the invention, there is provided an aircraft engine assembly comprising a generator drive disconnect device as described herein before.

According to a third aspect of the invention, there is provided an aircraft comprising the aforementioned aircraft engine assembly.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

In the following detailed description, the invention will be described in more detail, by way of example only, with reference to the accompanying drawings, in which.

DETAILED DESCRIPTION

Figure 1:
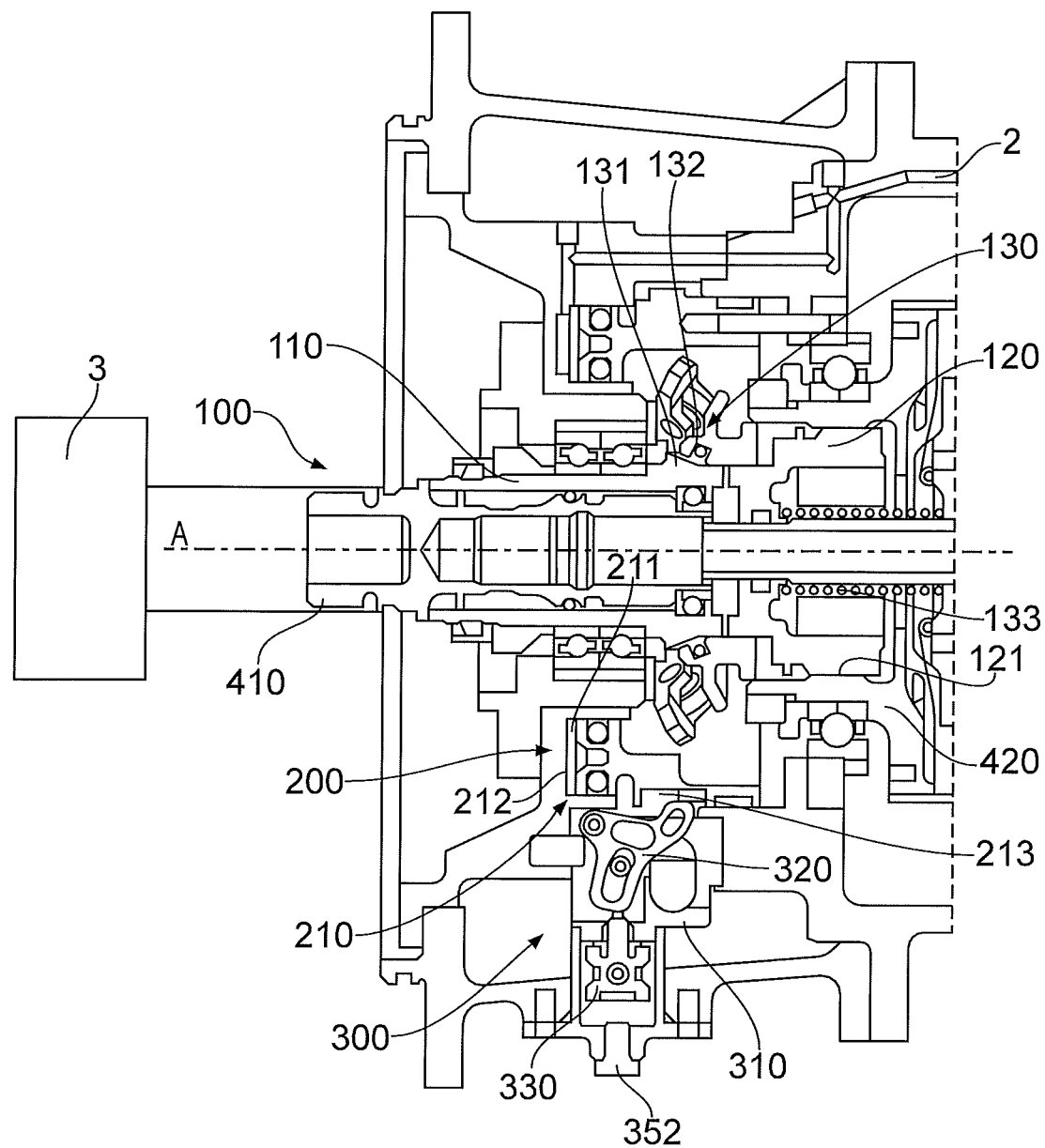
FIG. 1 shows a cross-sectional illustration of the generator drive disconnect device according to an embodiment of the present invention, in the connected configuration.
Figure 2:
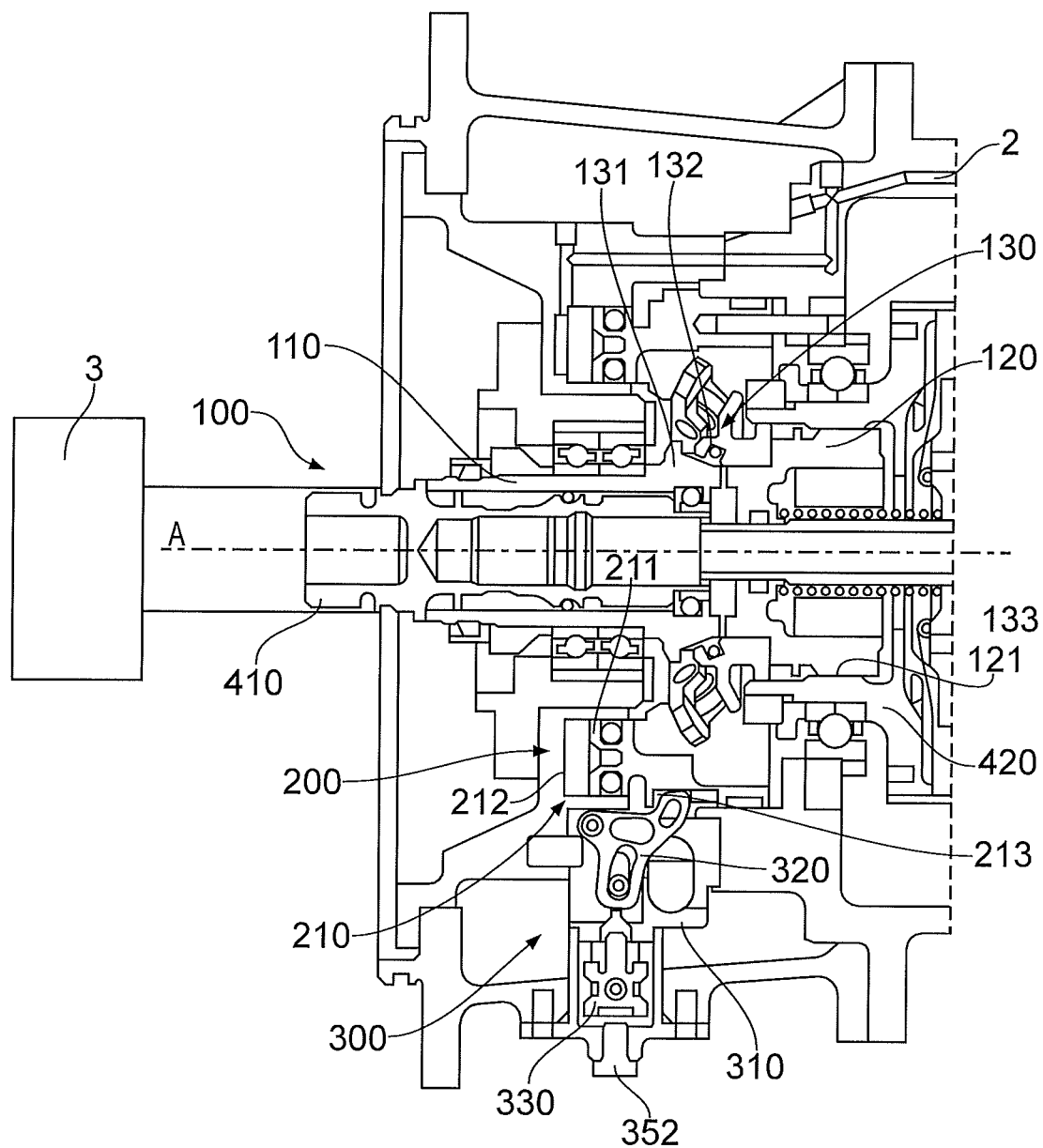
FIG. 2 shows a cross-sectional illustration of the generator drive disconnect device of FIG. 1, in the disconnected configuration.

With reference to FIGS. 1 and 2, there is shown a generator drive disconnect device 1 of a generator 2 (shown in part) arranged to be driven by an aircraft engine (shown schematically as item 3 in FIG. 1). The generator drive disconnect device 1 can be comprised in a generator 2, arranged to be driven by an aircraft engine 3.

The disconnect device 1 comprises drive transfer means 100, a disconnect mechanism 200 and a latch mechanism 300. The disconnect mechanism 200 is configured to move the drive transfer means 100 from a connected configuration, as shown in FIG. 1, to a disconnected configuration, as shown in FIG. 2. The drive transfer means 100 comprises an input shaft 110 and an output shaft 120. The input and output shafts 110, 120 are coaxially aligned about input shaft axis A. The input shaft 110 is coupled to a drive shaft 410 from the engine 3 and the output shaft 120 is coupled to a rotor shaft 420 of the generator 2 by splines 121 extending circumferentially around its exterior surface such that the output shaft 120 is axially moveable relative to the rotor shaft 420. In the connected configuration of the drive transfer means 100, the input shaft 110 and the output shaft 120 are rotated together, at the same rotational speed.

Between the input and output shafts 110, 120, there is provided a separable drive transfer device 130 which is moveable between connected and disconnected configurations. The separable drive transfer device 130 can be any suitable device by which rotary movement of the input shaft 110 is selectively transferred to the output shaft 120. In this example, the separable drive transfer device 130 is a clutch comprising a first plate 131 coupled to the input shaft 110, a second plate 132 coupled to the output shaft 120, and a spring 133 which urges the output shaft 120 and the second plate 132 towards the input shaft 110 and the first plate 131. Friction between the first plate 131 and the second plate 132, in the case of a friction based clutch mechanism, and/or the meshing of teeth of dogs or face gears of the respective first and second plates in certain embodiments, couples a rotational driving torque between the rotor shaft 420 and the gearbox drive shaft 410, allowing the gearbox drive shaft to drive the rotor shaft (or vice versa, which can allow the generator to function as a starter-generator if required). Operation of the drive transfer device 130 is controlled by the disconnect mechanism 200.

The disconnect mechanism 200 is arranged to move the drive transfer means between its connected and disconnected configurations. In this example, the disconnect mechanism is engageable with the second plate 132 of the drive transfer device 130 to move the output shaft 120 axially away from the input shaft 110 and thereby disengage the drive transfer device 130 by moving it to the disconnected configuration. In other examples, the disconnect mechanism may engage with one or more other components of the drive transfer device 130, for example axially moveable input or output shafts or the first plate 131, in order to move the drive transfer means between its connected and disconnected configurations.

The disconnect mechanism 200 comprises an actuator 210 having a piston 211 which is moveable within a chamber 212 between a first position, as shown in FIG. 1, and a second position, as shown in FIG. 2. In this example, the piston 211 and chamber 212 are annular and arranged around the drive transfer device 130 for improved packaging of the overall disconnect mechanism. The actuator may be any suitable type of actuator, for example a pneumatic actuator, a hydraulic actuator, or an electrically driven actuator, such as a solenoid. In this example, the actuator is a pneumatic actuator and the disconnect mechanism 200 also includes a gas storage means (not shown) which is connected to the chamber 212 by a pipe (not shown). When actuation of the disconnect device is required, compressed gas is transferred by a gas release means, such as a valve or a moveable puncture device for rupturing a seal of the gas storage means, from the gas storage means to the chamber 212 via the pipe to move the piston 211 from the first position to the second position. The force from the compressed gas exceeds the force from the spring 133 of the clutch 130 thereby moving the drive transfer means 130 to the disconnected configuration by driving the second plate 132 away from the first plate 131. The actuator has an outer surface on which a recess 213 is formed and with which the latch mechanism 300 interacts to hold the actuator in the second position, and therefore hold the drive transfer device 130, and the disconnect device as a whole, in the disconnected configuration.

The latch mechanism 300 includes a support structure 310, a latch member in the form of a latch plate 320, and a biasing mechanism in the form of a spring assembly 330. The support structure 310 is fixed in position relative to the rest of the disconnect device 1 and forms a base by which the rest of the latch mechanism 300 is supported. The latch plate 320 is moveable between a retracted position, as shown in FIG. 1, and an extended position, as shown in FIG. 2, in which movement of the actuator towards the first position from the second position is prevented by the latch plate 320, as discussed in more detail below. The spring assembly 330 is configured to apply a biasing force to the latch plate 320 to bias it towards the extended position. The spring assembly 330 is also configured to apply to the latch plate 320 a reaction force to resist movement of the latch plate 320 towards the retracted position. The reaction force has a magnitude which increases as a function of the distance of the latch member 320 from the retracted position. Thus, as the latch plate 320 moves towards the extended position, the magnitude of the reaction force increases.

Figure 3:
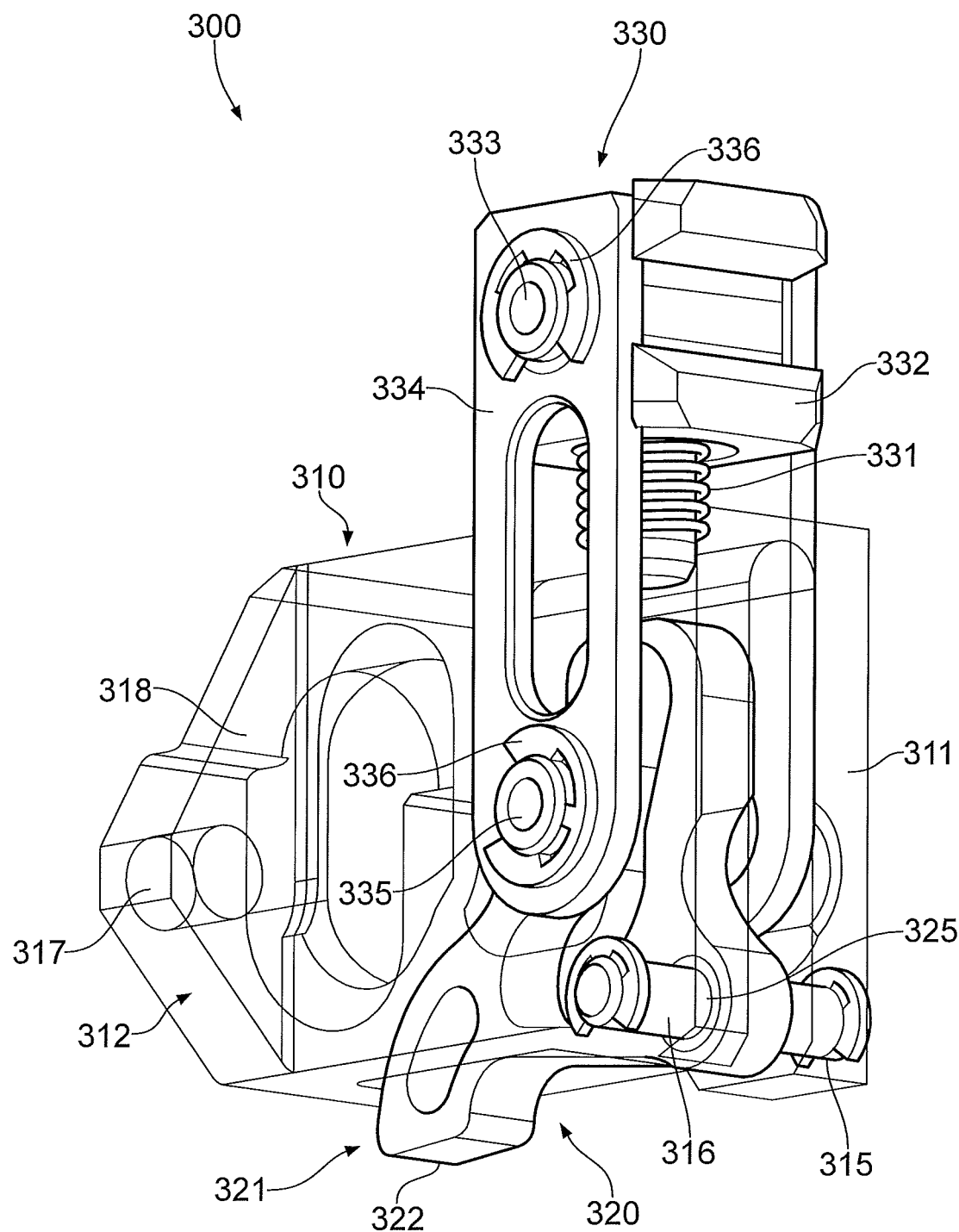
FIG. 3 shows a perspective view of a first embodiment of latch mechanism for the generator drive disconnect device of FIGS. 1 and 2.
Figure 4:
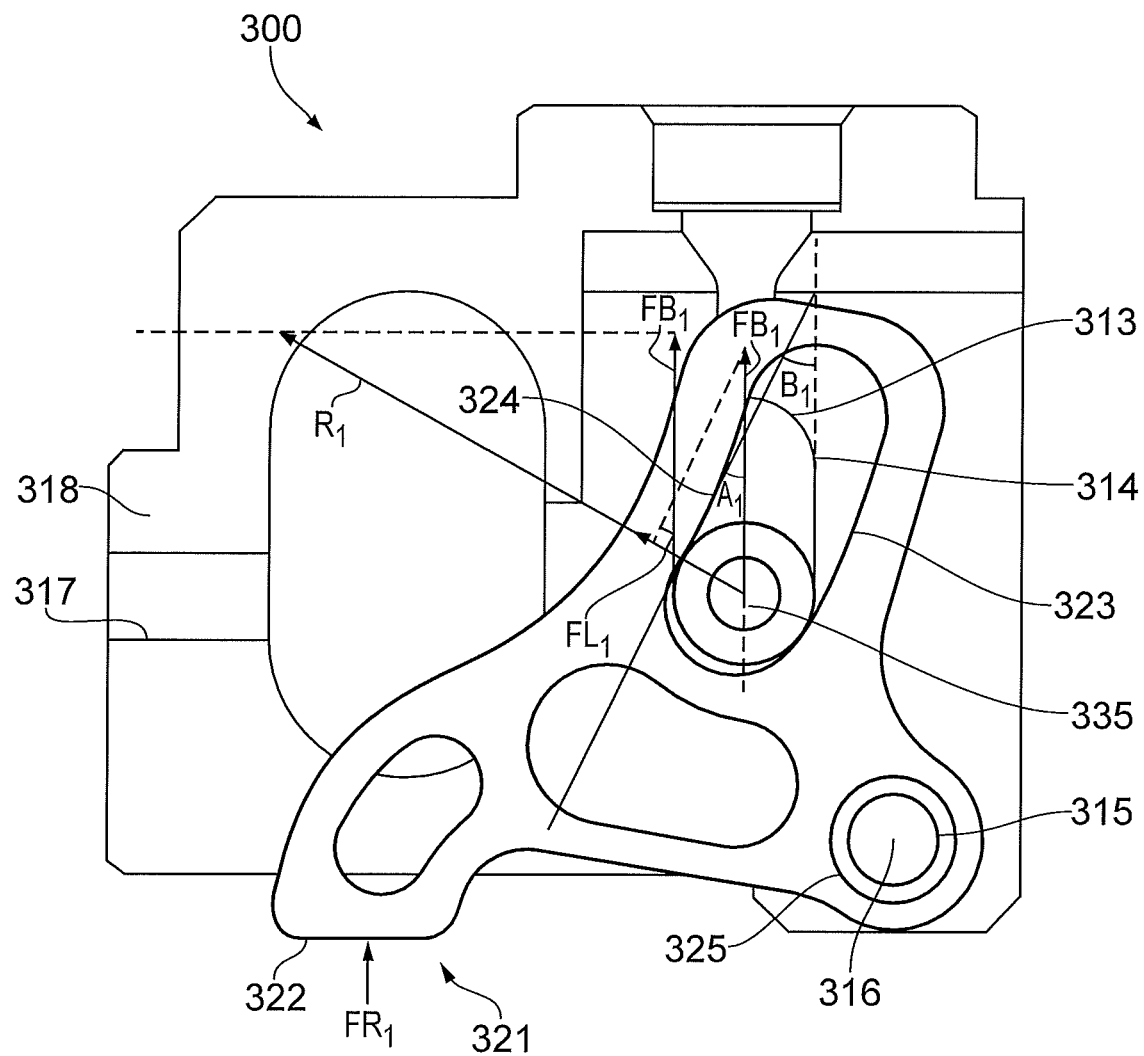
FIG. 4 shows a side view of the latch mechanism of FIG. 3, in which the latch member is shown in the retracted position.
Figure 5:
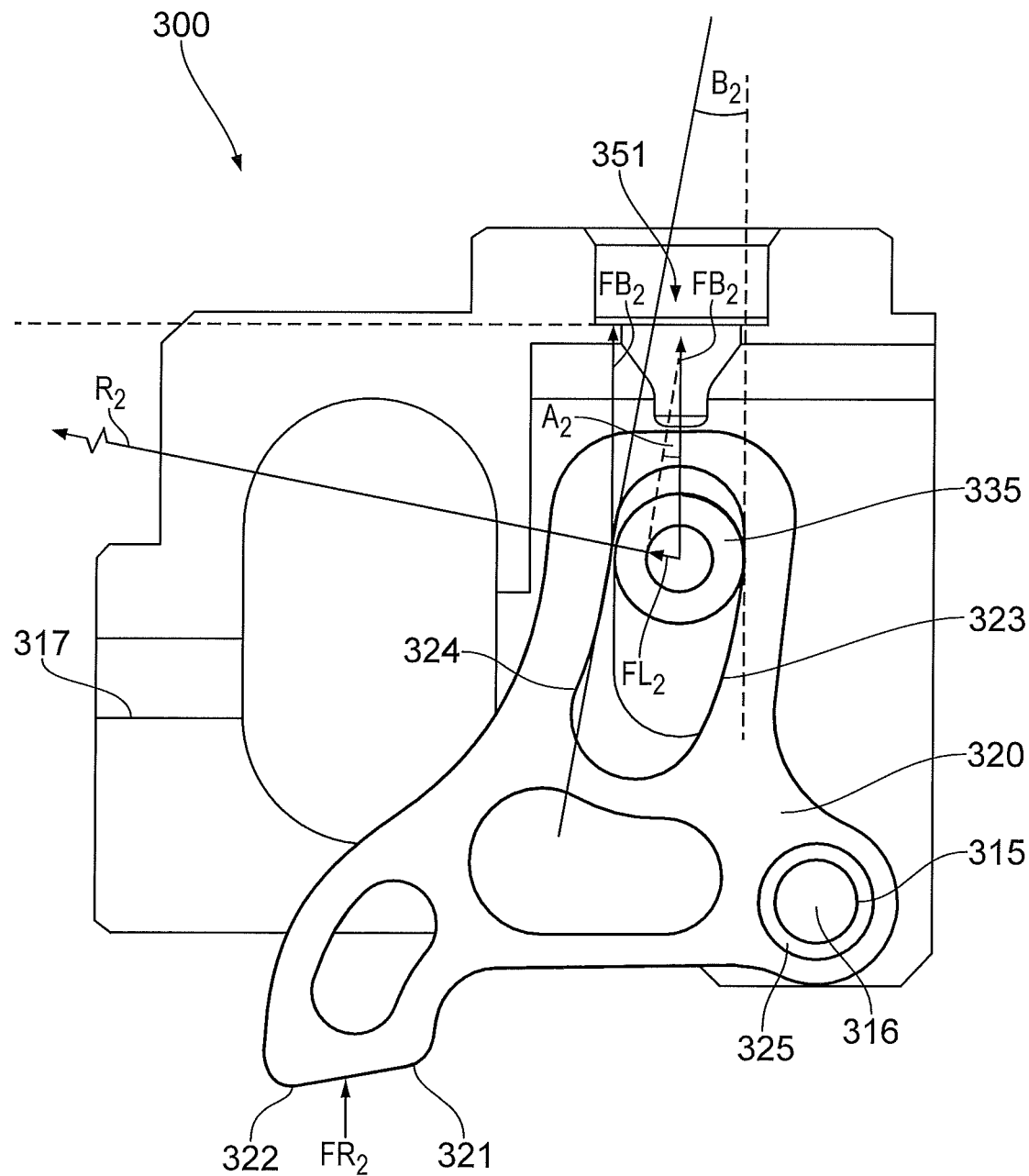
FIG. 5 shows a side view of the latch mechanism of FIG. 3, in which the latch member is shown in the extended position.

FIGS. 3 to 5 show the latch mechanism 300 according to the present invention in which the support structure 310, latch member 320, and biasing mechanism are shown in more detail.

The support structure 310 comprises a support frame 311 and a mounting portion 312 by which the support structure 310 is fixed in position relative to other fixed components of the disconnect device 1. The support frame 311 has two support arms extending along either side of the latch member 320 by which the latch member 320 is supported. The support arms include a pair of support slots 313, each support slot 313 extending through one of the support arms on either side of the latch member 320. The support slots 313 define a bearing surface 314 forming part of a cam follower mechanism of the latch mechanism 300. The support arms of the support frame 311 also include a pair of pivot holes 315 through which a pivot pin 316 extends to rotatably mount the latch member 320 on the support structure 310. The mounting portion 312 may be fixed in position by any suitable fastener. In this example, the mounting portion 312 includes bolt holes 317 extending through a mounting plate 318 by which the support structure 310 can be fixed in position to the generator housing using threaded bolts.

The latch plate 320 includes a latch portion 321 having a latch surface 322 by which the disconnect mechanism can be held in place when the latch plate 320 is in the extended position to retain the drive transfer means in a disconnected configuration. The latch plate 320 also includes a curved latch slot 323 defining a curved cam surface 324 by which forces from the biasing mechanism 330 are applied to the latch plate 320. The latch slot 323 forms part of the cam follower mechanism of the latch mechanism 300. The latch plate 320 also includes a latch pivot hole 325, through which the pivot pin 316 extends. As with the support structure 310, the latch plate 320 may further include one or more cut-out portions 325 by which the overall weight of the latch mechanism can be reduced.

The biasing mechanism 330 includes a biasing means 331, a sprung block 332, a sprung pin 333, a pair of link plates 334, and a drive pin 335. The biasing means generates a biasing force in a biasing direction. In this example, the biasing means is a coil spring which is mounted at one of its ends to the support structure 310 and is connected at its other end to the sprung block 332 so that the biasing force is applied to the sprung block 332 in a biasing direction away from the disconnect mechanism 200. The sprung pin 333 extends through the spring block 332 and is connected at each of its ends to a first end of the link plates 334. In a similar manner, the drive pin 335 is connected at each of its ends to the link plates 334, at the opposite end of the link plates 334 to the sprung pin 333. In this manner, the drive pin 335 is biased away from the disconnect mechanism 200 by the biasing means 331 via the link plates 334 and the sprung spin 333. In this example, the sprung pin 333 and the drive pin 335 each extend through holes in the link plates 335 and are held in place by circlips 336. The drive pin 335 extends through the support slots 313 in the support arms of the support frame 311 and is moveable within the support slots 313 in contact with the bearing surface 314 defined by each support slot 313. The drive pin 335 also extends through the latch slot 323 in the latch member 320 and is moveable within the latch slot 323 in contact with the cam surface 324 defined by the latch slot 323. In this manner, movement of the drive pin 335 is constrained by the support slots 313 and the latch slot 323. The drive pin 335 is biased away from the disconnect mechanism 200 by the spring 331 and is constrained to move relative to the support structure 310 along the direction of the bearing surfaces 314 of the support slots 313. In this example, the bearing surfaces 314 are linear and substantially parallel with the spring axis of the spring 331. As such, the drive pin 335 is biased by the spring 331 to move along a path which is parallel with the biasing direction. This can maximise the efficiency with which the biasing force is transferred to the drive pin 335. Together, the cam surface 324 and the drive pin form a cam follower mechanism.

FIG. 4 includes a schematic illustration of the forces applied by the biasing mechanism to the latch mechanism, when the latch member 320 is in the retracted position. In the retracted position, the drive pin 335 (i.e. the follower) is in contact with a first portion of the cam surface 324 (i.e. the cam) which extends at a first angle of A1 relative to the biasing direction and at a third angle of B1 relative to the bearing surface 314. In this example, the bearing surface 314 adjacent to the first portion of the cam surface 324 is parallel with the biasing direction and so the first and third angles, A1, B1 are the same, although this might not be the case in other embodiments. The biasing means applies a first biasing force of FB1 to the drive pin 335, which in turn applies a first latching force FL1 perpendicular to the first portion of the cam surface 324 to bias the latch member 320 towards the extended position. As can be seen, the first latching force FL1 is broadly equal to FB1sin(A1). As the latch member 320 rotates towards the extended position, the drive pin 335 moves along the support slot 313 and along the latch slot 323 to the position shown in FIG. 5.

In addition to biasing forces applied by the biasing means 331 to rotate the latch member 320 towards the extended position, the latch member 320 can also be subjected to retraction forces which will tend to rotate the latch member 320 towards the retracted position. Such retraction forces could be caused by acceleration, or operational forces caused by the disconnect mechanism, for example. For illustrative purposes, the retraction forces are shown as a single point load FR1 exerted at the latch surface. The biasing mechanism is configured to resist these retraction forces by applying to the latch plate 320 a reaction force to resist movement of the latch member 320 towards the retracted position. As can be seen, in the retracted position, a first reaction force R1 is exerted by the drive pin 335 on the latch member 320 perpendicularly to the first portion of the cam surface 324. Since the drive pin 335 is prevented from moving away from the cam surface 324, in order to rotate the latch member 320 in the retraction direction, the retraction force FR1 must generate sufficient torque to overcome the first reaction force R1 and thereby push the drive pin 335 away from the biasing spring 331. The first reaction force R1 has a magnitude which can be approximated by dividing the first biasing force FB1 by sin(A1). In order to rotate the latch member 320, the retraction force FR1 must generate a force which opposes the first reaction force R1 and exceeds it. When the latch member 320 is in the retracted position, it is beneficial for the reaction force to be relatively low so that the disconnect mechanism is not unduly hindered in moving from its first position to its second position to disconnect the drive transfer means.

FIG. 5 includes a schematic illustration of the forces applied by the biasing mechanism to the latch mechanism, when the latch member 320 is in the extended position. In the extended position, the drive pin 335 (i.e. the follower) is in contact with a second portion of the cam surface 324 (i.e. the cam) which extends at a second angle of A2 relative to the biasing direction and at a third angle of B2 relative to the bearing surface 314. In this example, the bearing surface 314 adjacent to the second portion of the cam surface 324 is parallel with the biasing direction and so the second and fourth angles, A2, B2 are the same, although this might not be the case in other embodiments.

As with the retracted position, the latch member 320 can also be subject to retraction forces which will tend to rotate the latch member 320 towards the retracted position. Again, for illustrative purposes, the retraction forces are shown as a single point load FR2 exerted at the latch surface. The biasing mechanism is configured to resist these retraction forces by applying to the latch plate 320 a reaction force to resist movement of the latch member 320 towards the retracted position. As can be seen, in the extended position, a second reaction force R2 is exerted by the drive pin 335 on the latch member 320 perpendicularly to the second portion of the cam surface 324. Since the drive pin 335 is prevented from moving away from the cam surface 324, the second retraction force FR2 must generate sufficient torque to overcome the second reaction force R2 and thereby push the drive pin 335 away from the biasing spring 331 in order to rotate the latch member 320 in the retraction direction. The second reaction force R2 has a magnitude which can be approximated by dividing the second biasing force FB2 by sin(A2). In order to rotate the latch member the retraction force R2 must generate a force which opposes the first reaction force R1 and exceeds it. When the latch member 320 is in the extended position, it is beneficial for the reaction force to be high so that the latch mechanism is not inadvertently de-latched from the disconnect mechanism by the retraction forces.

For a linear coil spring, the magnitude of the biasing force decrease as the spring is displaced away from the compressed condition. Thus, the biasing force exerted by the biasing mechanism can be expected to be lower when the latch member 320 is in the extended position. In other words, generally, the first biasing force will be greater than the second biasing force. For conventional sprung latch systems this can be problematic, since the high spring rate required to generate sufficient resistance to de-latching in the extended position can result in excessively high forces being exerted by the latch on the actuator when the latch is in the retracted position. Conversely, the low spring rate required to avoid hindering the operation of the disconnect mechanism when the latch member 320 is in the retracted position can lead to insufficient resistance to de-latching in the extended position.

This problem can be overcome by the disconnect device of the present invention.

As can be seen in FIGS. 4 and 5, despite the fact that the first biasing force FB1 is greater than the second biasing force FB2, the second reaction force R2 is far higher than the first reaction force R1. Consequently, the retraction force required to rotate the latch member in the retraction direction from the extended position is also far higher than the retraction force required to rotate the latch member 320 in the retraction direction from the retracted position. This is further illustrated in FIG. 6, below.

Figure 6:
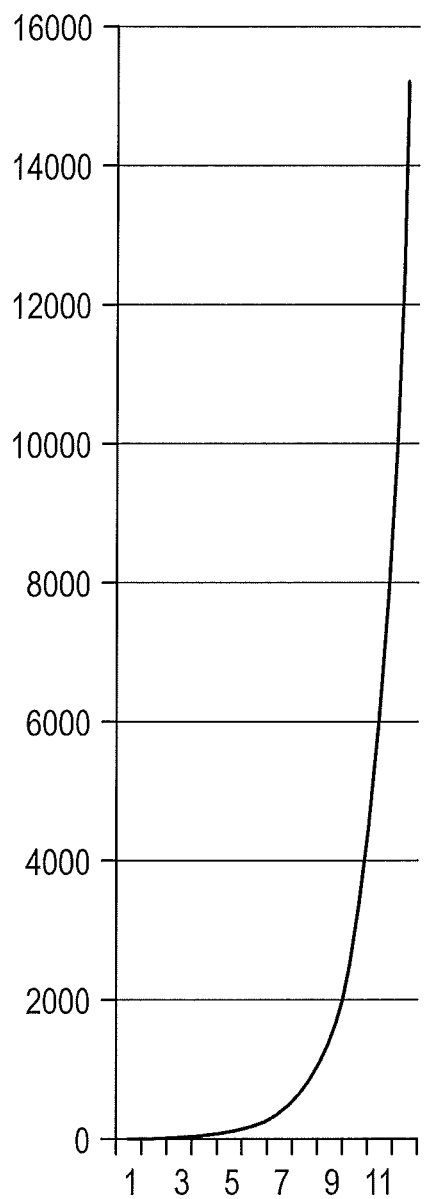
FIG. 6 is a chart illustrating the force required to move the latch mechanism of FIGS. 3 to 5 in the retraction direction as function of the position of the latch member.

FIG. 6 is a chart illustrating reaction force as a function of latch member position. As can be seen, when the latch member 320 is in the retracted position (position "1" on the chart), the reaction force is relatively low. This means that the de-latching force required to move the latch member 320 in the retraction direction is also fairly low. Thus, movement of the disconnect mechanism is largely unhindered by the latch mechanism. However, as the latch member 320 moves towards the extended position (position "11" on the chart) the reaction force increases exponentially as a function of the distance of the latch member 320 from the extended position. This is because the angle of the cam surface 324 becomes shallower towards the extended position and tends towards the biasing direction and the orientation of the bearing surface. In fact, the curved shape of the latch slot means that the angle of the cam surface 324 could be arranged such that the cam surface 324 is parallel with the bearing surface and the biasing direction, or negative with respect to the bearing surface or the biasing direction, when the latch member is in the extended position. In such examples, the cam mechanism forms a mechanical or geometric lock when the latch member is in the extended position so that the latch mechanism could not be de-latched by any amount of de-latching force exerted on the latch member.

Figure 7:
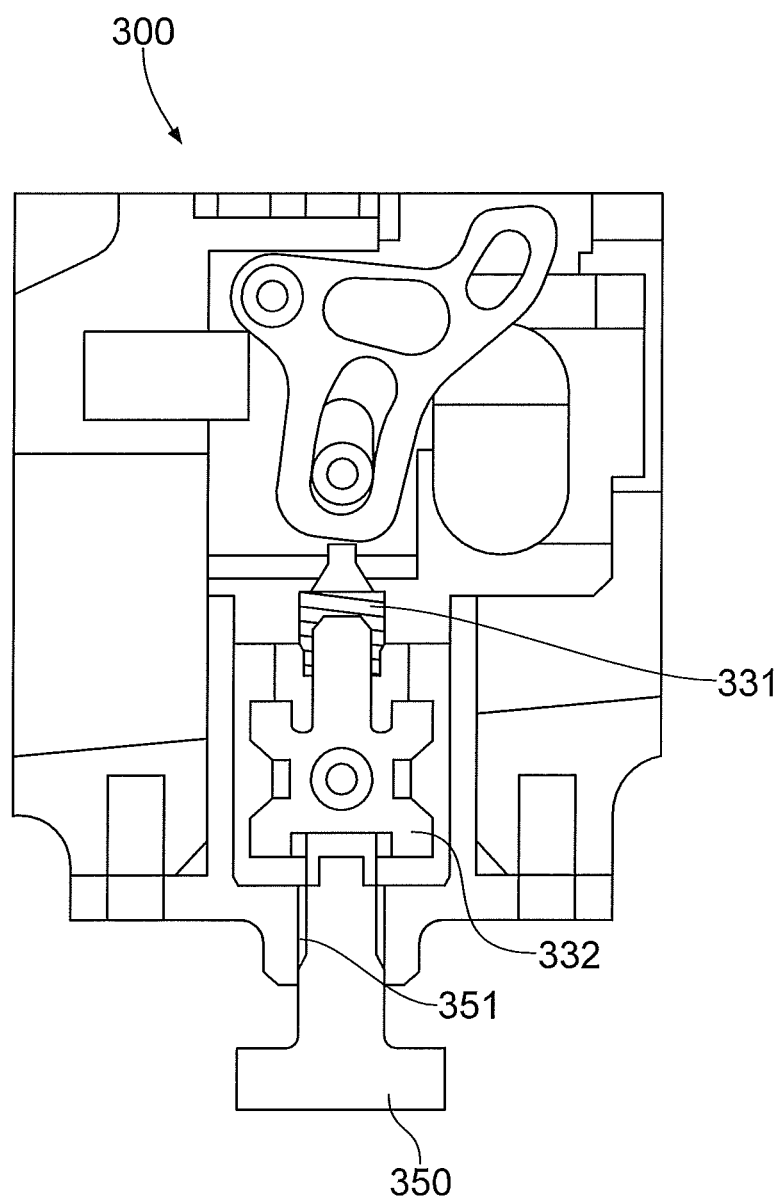
FIG. 7 shows an enlarged cross-sectional view of the generator drive disconnect device of FIGS. 1 and 2 into which a de-latching tool is inserted.

To return the latch mechanism to the retracted position, a tool 350 can be inserted into an access port 351 in the disconnect device 1 to push on the sprung block 332 and compress the biasing means 331, as shown in FIG. 7.

Operation

In the following, the operation of the generator drive disconnect device shall be described with reference to FIGS. 1 to 7.

In the connected configuration of the drive transfer means 130, shown in FIG. 1, the clutch arrangements 131 and 132 of the drive transfer device 130 are engaged so that the input shaft 110 and the output shaft 120 are connected. In particular, the drive transfer device 130 is biased towards the output shaft 120 by the resilient member 133, such that the clutch arrangements 131 and 132 are in meshing contact. Rotary drive input via the input shaft 110 is transferred from the drive shaft 410 to the drive transfer device 130. The drive transfer device 130, in turn, is connected to the output shaft 120 via the clutch arrangements 131, 132, and thus drives the output shaft at the same rotational speed as the input shaft 110. The latch mechanism 300 is in the retracted position, with the latch surface of the latch member resting against the outer surface of the actuator of the disconnect mechanism. Although the latch member is biased towards its extended position, and therefore towards the actuator, the biasing force and the resulting friction forces are low enough that movement of the actuator is not hindered by the latch member. This is due to the arrangement of the cam surface 324 and the drive pin, as discussed above.

If a fault condition, or other trigger condition, requires the generator to be disconnected, the disconnect mechanism 200 is actuated to separate the clutch arrangements 131, 132 from each other. To this end, the piston 211 of the actuator is moved in the chamber 212 in the direction of the input shaft axis A, causing the output shaft 120 to move in the direction of the input shaft axis and away from the input shaft 110. As the output shaft 120 is moved away from the input shaft 110, the clutch arrangements 131 and 132 disengage, thereby mechanically decoupling the input shaft 110 from the output shaft 120 and thereby placing the disconnect device 1 in the disconnect configuration, as shown in FIG. 2.

In the disconnected configuration of the disconnect device 1 shown in FIG. 2, the resilient member 133 (coil spring) is compressed and acts to restore the connected configuration shown in FIG. 1. However, when the piston 211 reaches the end of its stroke in its second position, the latch surface of the latch member is received in the recess on the outer surface of the piston 211. This prevents movement of the actuator and holds the disconnect device in the disconnected configuration. Furthermore, due to the position of the pivot, any lateral forces applied to the latch member by the actuator in the connecting direction will be in the extension direction of the latch member and further increase the security with which the disconnect device is held in the disconnect configuration by the latch mechanism. As such, it is not possible to transfer the drive transfer means back into its connected configuration while the latch member is in its extended position.

If the condition requiring disconnection of the generator has been resolved, then the latch member can be rotated back to the retracted position by removing a bung 352 from an access port 351 in the disconnect device 1 and inserting a tool 350 in the access portion 351 to push the drive pin 335 away from the spring 331 and against the biasing force. The actuator can then be moved back to its first position and the latch member will be held in the retracted position in which the latch surface rests against the outer surface of the actuator.

As will be appreciated, the new arrangement of the generator drive disconnect device according to the present invention provides a reliable and secure way of disconnecting the generator. Although the cam mechanism is illustrated as being formed by a cam surface on the latch member and a follower attached the biasing member, these components could be reversed so that the follower is connected to the latch member and the cam surface is formed as part of the biasing mechanism.

Although the latch slot is described as curved, the latch slot could be formed of one or more linear portions. For example, the latch slot could be a V-shaped slot, or a simple linear slot at an angle to the bearing surface. Such a linear slot could still result in an increase in the resistance to retraction of the latch member towards the extended position as the angle of the cam surface will change relative to the bearing surface as the latch member rotates.

The invention claimed is:

1. A generator drive disconnect device of a generator arranged to be driven by an aircraft engine, the disconnect device comprising:
    a drive transfer means for transferring drive from an input shaft of the generator to a rotor of the generator, the drive transfer means having a connected configuration and a disconnected configuration;
    a disconnect mechanism configured to move the drive transfer means from the connected configuration to the disconnected configuration; and
    a latch mechanism configured to hold the drive transfer means in the disconnected configuration, the latch mechanism comprising:
    a support structure;
    a latch member, moveable between an extended position in which the latch mechanism restricts movement of the drive transfer means from the disconnected configuration to the connected configuration, and a retracted position in which the latch mechanism does not restrict movement of the drive transfer means from the disconnected configuration to the connected configuration; and
    a biasing mechanism configured to generate a biasing force to bias the latch member towards the extended position and to apply a reaction force to the latch member to resist movement of the latch member towards the retracted position, the reaction force having a magnitude which increases as the distance of the latch member from the retracted position increases.

2. The generator drive disconnect device of claim 1, further comprising a cam-follower mechanism comprising a cam surface and a follower by which the biasing force and the reaction force are applied to the latch member.

3. The generator drive disconnect device of claim 2, wherein the latch member comprises the cam-surface and the biasing mechanism comprises the follower.

4. The generator drive disconnect device of claim 3, wherein the biasing mechanism comprises a biasing means configured to apply the biasing force to the follower in a biasing direction.

5. The generator drive disconnect device of claim 4, wherein the cam surface is shaped such that, when the latch member is in the retracted position, the follower is in contact with a first portion of the cam surface which is at a first angle to the biasing direction, and, when the latch member is in the extended position, the follower is in contact with a second portion of the cam surface which is at a second angle to the biasing direction, the second angle being less than the first angle.

6. The generator drive disconnect device of claim 3, wherein the latch member comprises a latch slot which defines the cam surface and within which the follower is received such that relative movement between the latch member and the follower is constrained along the latch slot.

7. The generator drive disconnect device of claim 3, wherein the support structure comprises a bearing surface along which the follower is configured to slide, the bearing surface being opposed to the cam surface.

8. The generator drive disconnect device of claim 7, wherein the support structure comprises a support slot which defines the bearing surface and within which the follower is received such that the follower is constrained to move along the support slot.

9. The generator drive disconnect device of claim 7, wherein the biasing mechanism comprises a biasing means for generating the biasing force in a biasing direction, and wherein the bearing surface is linear and is substantially parallel to the biasing direction.

10. The generator drive disconnect device of claim 2, wherein the cam surface is curved such that the magnitude of the reaction force increases exponentially as the latch member moves towards the extended position.

11. The generator drive disconnect device of claim 1, wherein the latch member is rotatably mounted to the support structure about a pivot for rotation between the retracted position and the extended position.

12. The generator drive disconnect device of claim 11, wherein the pivot is positioned such that, when the latch member is in the extended position, movement of the drive transfer means towards the connected configuration biases the latch member toward the extended position.

13. The generator drive disconnect device of claim 11, further comprising a cam-follower mechanism comprising a cam surface and a follower by which the biasing force and the reaction force are applied to the latch member, the cam follower mechanism being configured such that a position of contact between the cam surface and the follower moves away from the pivot as the latch member moves towards the extended position.

14. The generator drive disconnect device of claim 1, wherein the disconnect mechanism comprises an actuator arranged to move the drive transfer means from the connected configuration to the disconnected configuration, and wherein the latch member comprises a latch surface which is biased against an outer surface of the actuator by the biasing mechanism to prevent movement of the actuator when the latch member is in the extended position.

15. The generator drive disconnect device of claim 14, wherein the outer surface of the actuator comprises a recess in which at least part of the latch surface is received when the drive transfer means is in the disconnected configuration.

16. The generator drive disconnect device of claim 14, wherein the latch surface is tapered relative to the outer surface of the actuator such that the latch surface is in contact with the outer surface of the actuator towards a radially outer end of the latch surface.

17. The generator drive disconnect device of claim 1, wherein the support structure comprises an access port through which a latch disengage tool is insertable to return the latch member to the retracted position from the extended position.

18. An aircraft engine assembly comprising the generator drive disconnect device in accordance with claim 1.

19. An aircraft comprising the aircraft engine assembly in accordance with claim 18.

* * * * *